(12) United States Patent
Widén

(10) Patent No.: US 9,919,368 B2
(45) Date of Patent: Mar. 20, 2018

(54) METHOD AND APPARATUS FOR FORMING A PROFILE GROOVE IN A KEY BLANK

(71) Applicant: WINLOC AG, Zug (CH)

(72) Inventor: Bo Widén, Torshälla (SE)

(73) Assignee: WINLOC AG, Zug (CH)

( * ) Notice: Subject to any disclaimer, the term of this patent is extended or adjusted under 35 U.S.C. 154(b) by 361 days.

(21) Appl. No.: 14/415,488

(22) PCT Filed: Jun. 11, 2013

(86) PCT No.: PCT/SE2013/050669
§ 371 (c)(1),
(2) Date: Jan. 16, 2015

(87) PCT Pub. No.: WO2014/014398
PCT Pub. Date: Jan. 23, 2014

(65) Prior Publication Data
US 2015/0209878 A1 Jul. 30, 2015

(30) Foreign Application Priority Data

Jul. 18, 2012 (SE) ........................................ 1250875

(51) Int. Cl.
*B23D 37/22* (2006.01)
*B23D 1/16* (2006.01)
(Continued)

(52) U.S. Cl.
CPC .............. *B23D 37/22* (2013.01); *B21D 53/42* (2013.01); *B23D 1/16* (2013.01); *B23D 37/06* (2013.01); *Y10T 409/4028* (2015.01)

(58) Field of Classification Search
CPC ........ B21D 53/42; B23D 37/22; B23D 37/06; B23D 1/16; Y10T 409/4028; E05B 19/0017

See application file for complete search history.

(56) References Cited

U.S. PATENT DOCUMENTS 4,453,432 A * 6/1984 Widen ................ E05B 27/0082
76/110
5,127,532 A * 7/1992 Cimino ............... E05B 19/0011
211/120

(Continued)

FOREIGN PATENT DOCUMENTS

AT 500 638 B1 7/2006
DE 10029113 C1 1/2002

(Continued)

OTHER PUBLICATIONS

Extended European Search Report for corresponding European Application No. 13819787.6 dated Mar. 7, 2016.

*Primary Examiner* — Omar Flores Sanchez
(74) *Attorney, Agent, or Firm* — Birch, Stewart, Kolasch & Birch, LLP

(57) ABSTRACT

A method and an apparatus for forming a profile groove in an elongated key blank having a key blade with opposite side surfaces. The profile groove is formed in a surface of the key blank by a punching or a broaching tool with at least one tooth. The punching or broaching tool is forced and guided longitudinally in parallel to the key blank so as to cut out the material of the key blank into the desired profile shape, corresponding to the cross-sectional shape of the at least one tooth. At the same time, the opposite side surfaces portions of the key blank are clamped or held firmly between opposite holding surfaces of a fixture, causing a firm abutment and retaining action on the longitudinal side surface portions of the key blank located adjacent to and all along the profile groove being formed.

15 Claims, 8 Drawing Sheets

(51) Int. Cl.
   *B21D 53/42* (2006.01)
   *B23D 37/06* (2006.01)

(56) References Cited

U.S. PATENT DOCUMENTS

| | | | | |
|---|---|---|---|---|
| 5,688,085 A | * | 11/1997 | Watts | E05B 9/084 409/259 |
| 5,715,717 A | | 2/1998 | Widen | |
| 6,413,024 B1 | * | 7/2002 | Chen | B23C 3/35 409/82 |
| 8,287,215 B2 | * | 10/2012 | Freeman | B23C 3/35 409/81 |
| 8,919,160 B2 | * | 12/2014 | Piotrowski | B23C 3/35 407/30 |
| 2006/0147289 A1 | | 7/2006 | Gimelfarb et al. | |
| 2011/0271723 A1 | | 11/2011 | Widén | |
| 2011/0289990 A1 | | 12/2011 | Piotrowski et al. | |

FOREIGN PATENT DOCUMENTS

| | | |
|---|---|---|
| EP | 0737265 A1 | 10/1996 |
| GB | 2301053 A | 10/1996 |
| JP | S57-052532 A | 3/1982 |
| JP | 10-137863 A | 5/1998 |
| WO | WO 2010/095997 A1 | 8/2010 |

\* cited by examiner

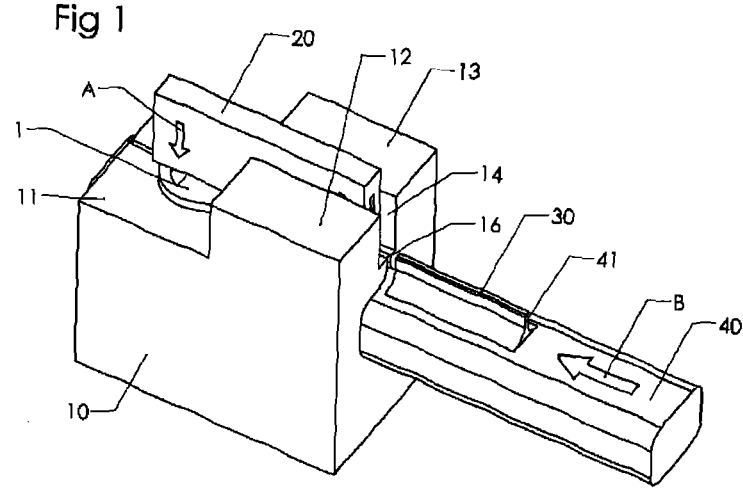
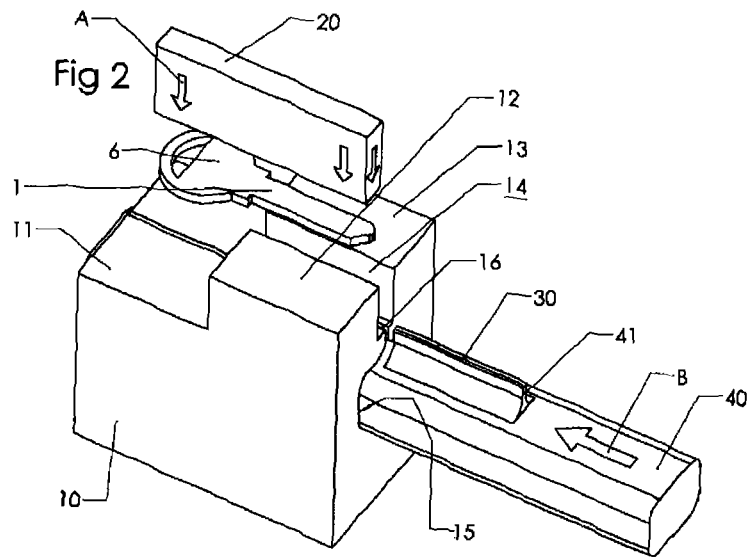

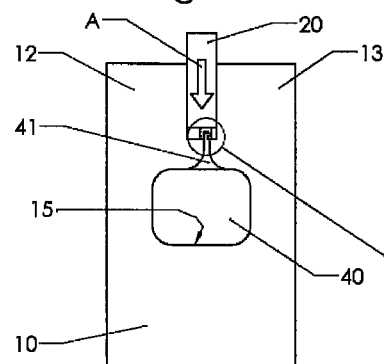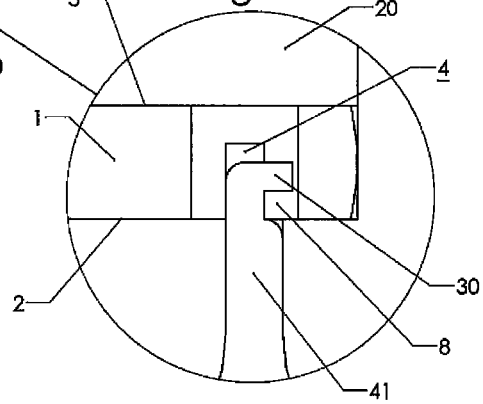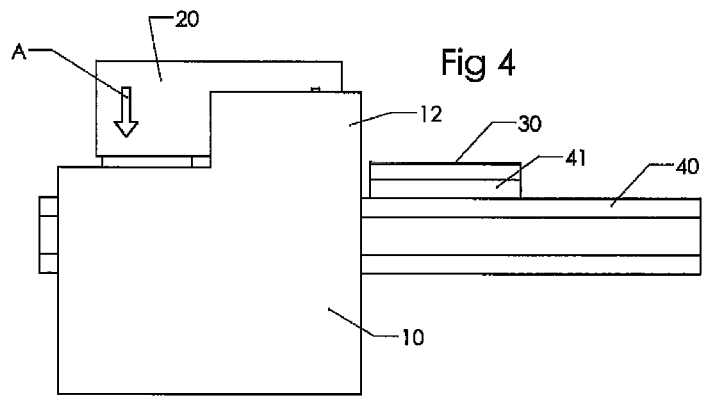

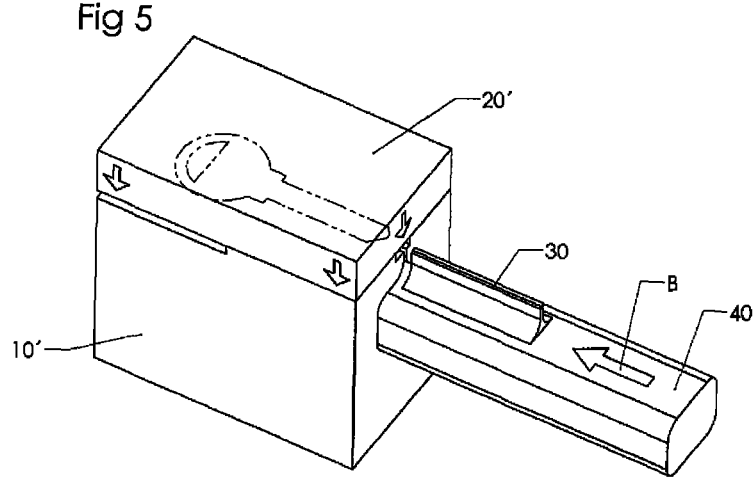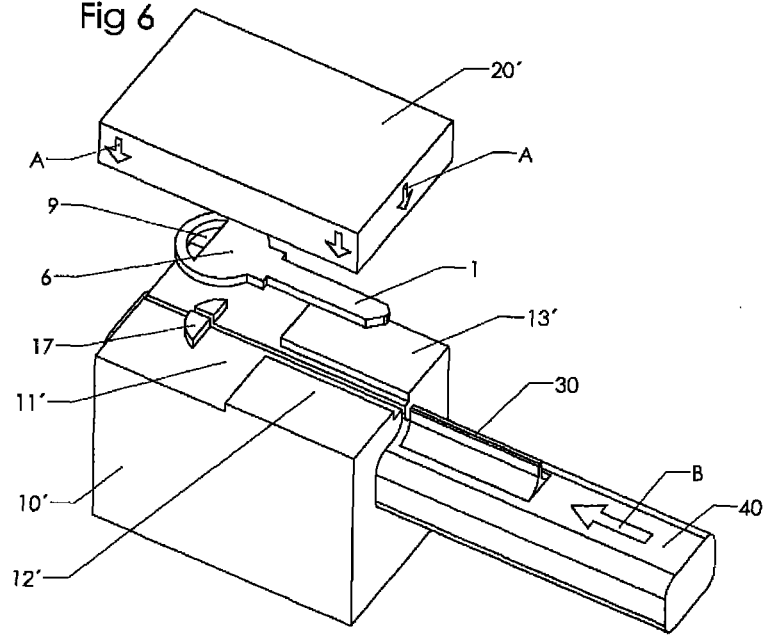

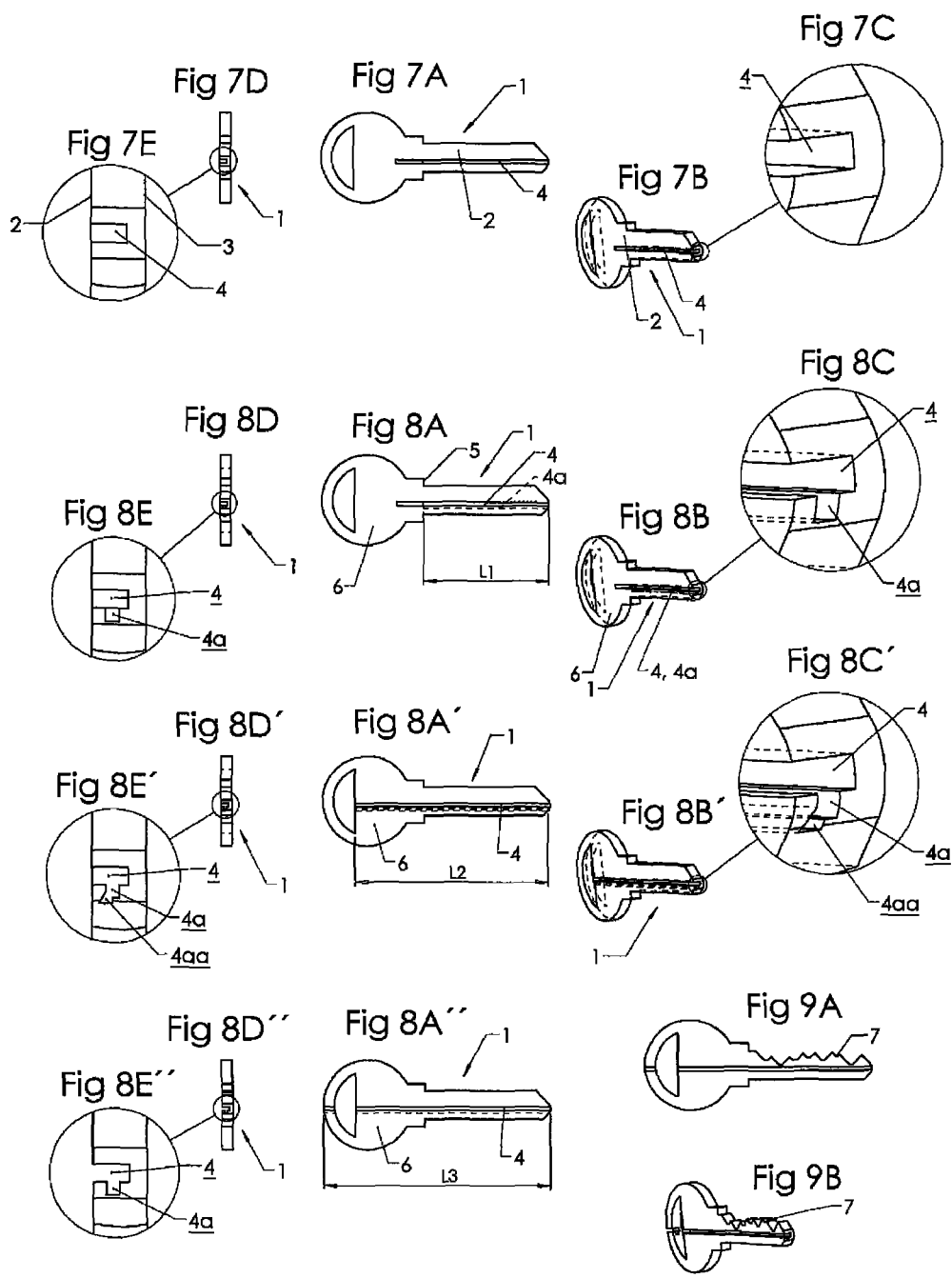

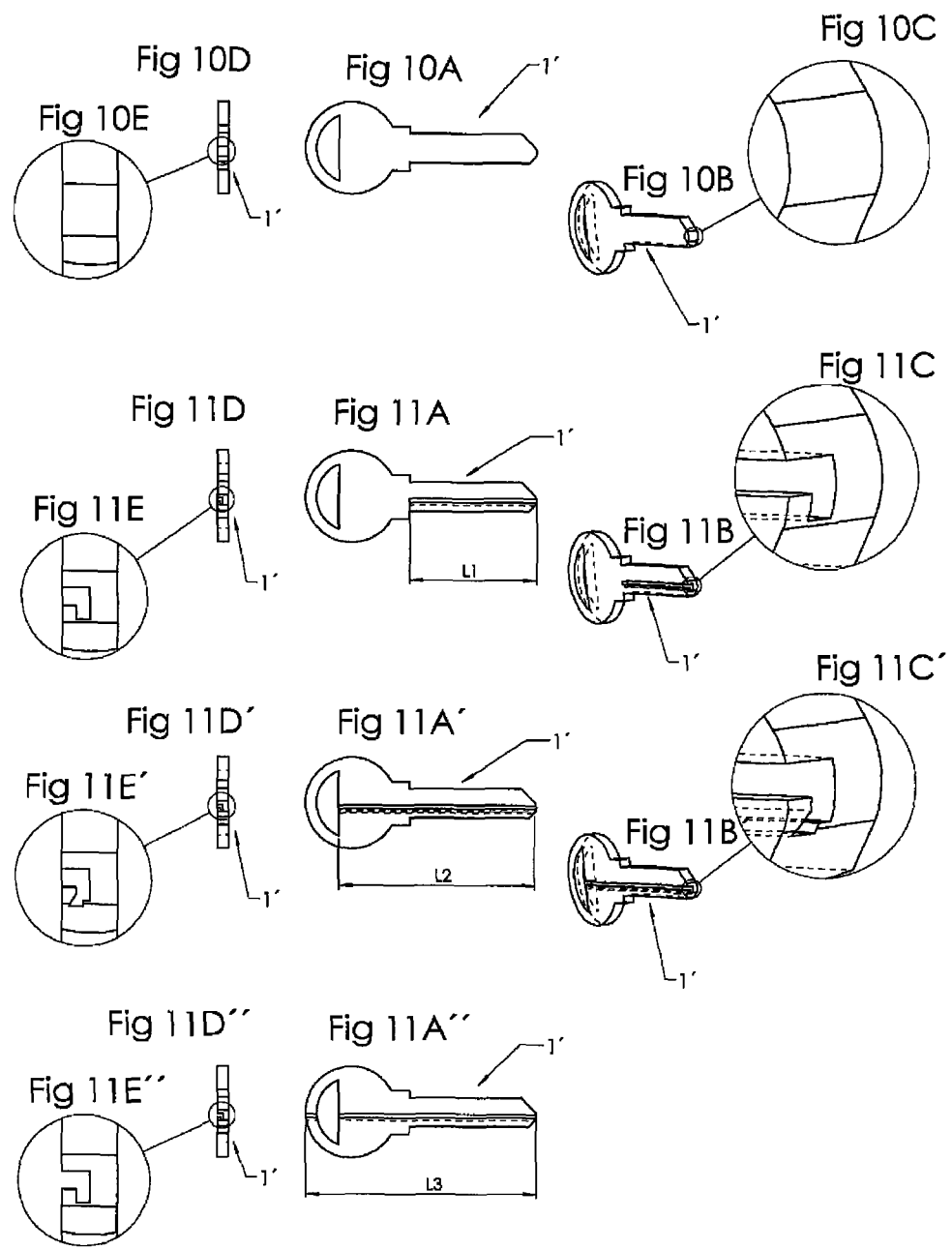

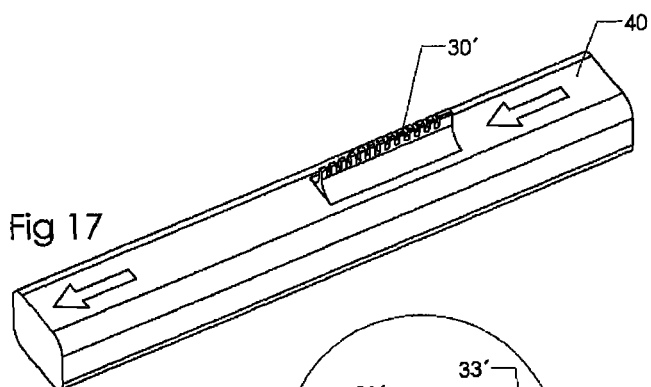
Fig 17
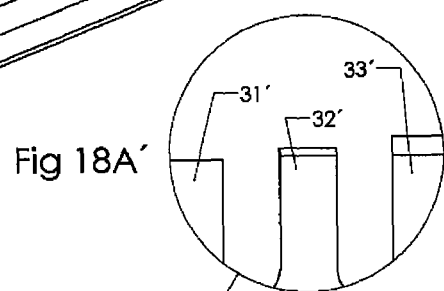
Fig 18A'
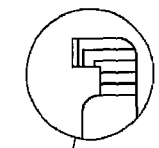
Fig 18B'
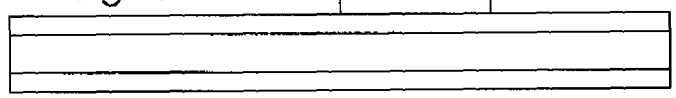
Fig 18A
Fig 18B
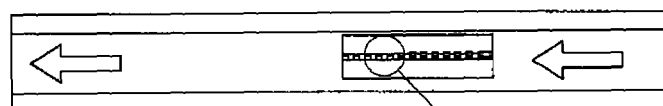
Fig 18C
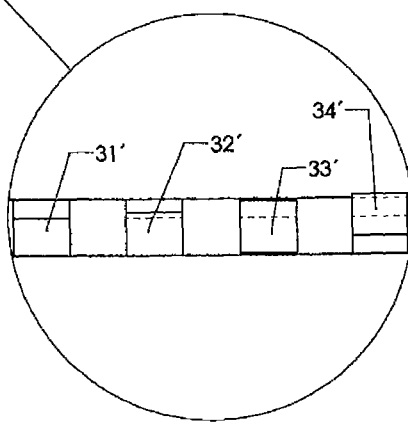
Fig 18C'

METHOD AND APPARATUS FOR FORMING A PROFILE GROOVE IN A KEY BLANK

CROSS-REFERENCE TO RELATED APPLICATIONS

The present application claims priority under 35 USC 119 to Swedish Patent Application No. 1250875-0 filed Jul. 18, 2012 and priority to PCT Application No. PCT/SE/2013/050669 filed on Jun. 11, 2013 the entire contents of which are hereby incorporated by reference.

FIELD OF THE INVENTION

The present invention relates to a method and apparatus for forming a profile groove in an elongated key blank having opposite side surfaces.

BACKGROUND OF THE INVENTION AND PRIOR ART

The normal way of forming profiles grooves in the sides of a key blank made of a durable material, such as brass, or so called "nickel silver", or some other metal alloy, is to use a rotating cutter disc which operates in a side surface of the key blank so that the material is cut away and a groove is formed, while moving the axis of the cutter disc linearly along the key blank.

However, the shape of the profile groove formed by such a conventional method is limited. Of course, the disc can be oriented at an angle relative to the key blank surface, and it is also possible to modify the shape of the peripheral, active surface of the cutter disc to some extent. Even so, there are numerous geometrical shapes of profile grooves that need other or additional forming methods, in particular undercut profile grooves of various geometrical shapes.

It is known per se to use linearly guided punching tools with one or more teeth, such as broaches with several teeth, for making profile grooves in key blanks. See e.g. the published international patent application WO/2010/095997 (WINLOC AG), page 2, last paragraph. Such tools are guided and forced linearly in parallel to the key blank while forming a profile groove, such as an undercut groove.

However, there are limitations as to the possible geometrical shapes that can be made with such punching tools. The forces are very strong, and there is a clear risk that the material of the key blade will start to float adjacent to the groove being formed in this way, especially if the wall between the inside of the groove and the outer surface of the key blank is relatively thin Thus, there is a great risk that the key blade will be deformed during this forming process, making the finished key useless.

Object of the Invention

Against this background, it is an object of the invention to provide a method and an apparatus that makes it possible to use linearly guided punching tools or broaching tools when making profile grooves in key blanks, without deforming the material of the key blank adjacent to the profile groove being formed in a surface of the key blank.

It is also an object to provide a method and an apparatus for groove making that is suitable for serial production of keys in large numbers, at relatively high speed.

Furthermore, the method and apparatus should be reasonable in cost and easy to operate.

SUMMARY OF THE INVENTION

A method according to the invention, which overcomes the problems indicated above, involves the steps of forming a profile groove in a side or edge surface of a key blank by means of a punching or broaching tool with at least one cutting tooth which is forced and guided longitudinally in parallel to said elongated key blade so as to cut out the material of said key blank into the desired shape of the profile groove, corresponding to the cross-sectional shape of said at least one cutting tooth, while at the same time holding said opposite side surfaces of the key blank between opposite holding surfaces of a fixture, causing a firm abutment and retaining action on the longitudinal side surface portions of the key blank located adjacent to and all along said profile groove being formed, whereby the key blank material adjacent to said profile groove is retained in a fixed state without being deformed during the punching operation.

Correspondingly, an apparatus according to the invention comprises a longitudinally guided punching or broaching tool with at least one cutting tooth for forced movement longitudinally along the key blank and cutting out said profile groove in the key blank during a punching or broaching operation, a fixture provided with a guiding device for longitudinally guiding said punching or broaching tool during said punching or broaching process, and a holding device in said fixture, said holding device having two opposite holding surfaces adapted to abut against two opposite, longitudinal side surface portions of said key blank during said punching or broaching operation, causing an abutment and retaining action on the longitudinal side surface portions located adjacent to and all along said profile groove being formed, whereby the key blank material adjacent to said profile groove is retained in a fixed state without being deformed during said punching or broaching operation.

Preferably, the punching or broaching tool is secured to a slide member which is forced and guided rectilinearly in relation to the fixture. The slide member may be guided in a longitudinal recess in the fixture, such as a cavity communicating with a longitudinal passageway leading out to the holding surface of the fixture abutting against a side or edge surface of the key blank. The slide member may be provided with a neck portion extending through such a passageway and carrying the punching or broaching tool.

The profile groove may be formed by a combination of processes, such as an initial forming with a rotating cutting disc and a final forming with a punching or broaching tool. However, it is also possible to form the whole profile groove in one processing step by means of the punching or broaching tool.

The punching or broaching tool may be provided with only one cutting tooth, or be constituted by a broach having two or more cutting teeth.

The profile groove being formed may be located in a side surface or in an edge surface of the key blank.

These and other features of the invention will be apparent from the detailed description below and from the appended claims.

BRIEF DESCRIPTION OF THE DRAWINGS

The invention will now be explained in detail below with reference to the drawings illustrating some preferred embodiments.

FIGS. 1 and 2 illustrate in perspective views the method and apparatus according to the invention, with a key blank, a fixture or holding device and a slide member carrying a punching or broaching tool;

FIG. 3A shows a cross-section through the apparatus shown in FIGS. 1 and 2;

FIG. 3B shows an enlarged portion of FIG. 3A;

FIG. 4 shows a side view of the apparatus of FIGS. 1 and 2;

FIG. 5 shows a second embodiment of an apparatus according to the invention, where the key blank is concealed in the fixture but is indicated by dash-dotted lines;

FIG. 6 shows the apparatus of FIG. 5, with an upper clamping or holding member being raised to an upper position;

FIGS. 7A, 7B, 7C, 7D, and 7E show various views of a key blank having an initial profile groove formed by a cutter disc;

FIGS. 8A, 8B, 8C, 8D, and 8E show corresponding views of the key blank of FIGS. 7A through 7E where the profile groove has been expanded into an undercut portion formed by the method according to the present invention;

FIGS. 8A', 8W, 8C', 8D' and 8E' show corresponding views of the key blank of FIGS. 8A through 8E where the profile groove has been expanded into a further undercut portion, the groove being extended also to a part of the gripping portion thereof;

FIGS. 8A", 8D", and 8E" show corresponding views of a key blank being formed with an undercut profile groove, where the groove extends along the whole length of the key blank, including its gripping portion;

FIGS. 9A and 9B show a side view and a perspective view, respectively, of a key blank as shown in FIGS. 8A" through 8E" and also provided with code cuts in its upper edge portion;

FIGS. 10A, 10B, 10C, 10D, and 10E show various views of a key blank before any groove is formed therein;

FIGS. 11A, 11B, 1C, 11D and 11E show corresponding views of the key blank shown in FIGS. 10A through 10E after forming an undercut groove by means of a punching or broaching tool in accordance with the present invention;

FIGS. 11A', 11B', 11C', 11D' and 11E' show corresponding views of the key blank shown in FIGS. 11A through 11E after forming an additional undercut portion of the profile groove;

FIGS. 11A", 11D" and 11E" show corresponding views of a key blank with an undercut profile groove formed in one step along the full length of thereof;

FIG. 17 shows a slide member, similar to the one shown in FIGS. 1 and 2, but having a punching or broaching tool in the form of a broach with several teeth arranged longitudinally;

FIGS. 18A, 18A', 18B and 18B' show various side views and end views of the slide member and the attached broach as shown in FIG. 17; and FIGS. 18C and 18C' show top views of the slide member and the attached broach of FIG. 17.

DETAILED DESCRIPTION OF SOME PREFERRED EMBODIMENTS

Figure 12:
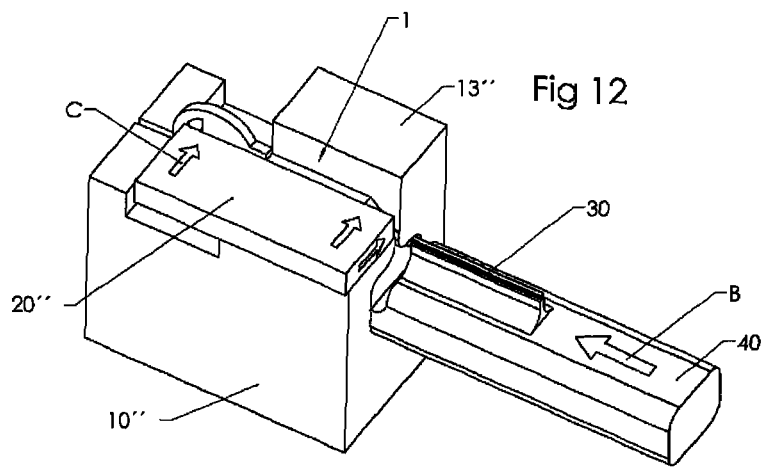
FIGS. 12 and 13 show perspective views of an apparatus according to the invention, with a large stationary block of a fixture and a relatively small movable block serving as a clamping or holding member, the key blank being oriented so as to stand in a vertical plane during the forming process, and the profile groove formed being located in a lower edge surface of the key blank.

The apparatus shown in FIGS. 1 and 2 comprises a solid fixture with two clamping or holding members, viz. a lower, stationary holding block 10, and an upper holding block 20, the latter being movable up and down so as to enable the positioning of a key blank 1 on an upper holding or seating surface 11 of the lower block 10, and thereafter lowering the upper block onto the key blank and holding it firmly between the two blocks 10, 20. The lower block 20 has two side portions 12, 13 extending upwards from the seating surface 11 and forming between themselves a chamber 14 in which the upper block 20 is movable vertically with a slight play. See also FIGS. 3A, 3B and 4.

As appears from FIGS. 1, 2 and 3B, the key blank 1 comprises a flat key blade, with opposite side surfaces 2, 3, and a grip portion 6.

In the lower position of the movable block 20, as shown in FIGS. 1, 3A, 3B and 4, the movable block 20 is held firmly so as to abut the upper side surface 3 of the key blank 1 with a clamping or holding force (arrows A in FIGS. 1, 3A and 4). This force does not have to be very great, but the movable block 20 should be maintained in its lower position so as to resist any tendency of the key blank to be moved or deformed during the forming process. In this way, both opposite side surfaces 2, 3 (FIG. 3B) of the key blank 1 are maintained exactly in their initial states or positions and will not be moved or deformed. This is especially true for a ridge portion 8 of the key blank between the side surface 2 and the undercut portion of the groove 4. In order to achieve this, the upper block 20 may be connected to a mechanism, such as a knuckle joint mechanism being structured in such a way that it will be maintained exactly in its final operative position upon being lowered to its lowermost position.

While being held firmly in its position between the two blocks 10, 20, the key blank will be cut by a punching or broaching tool 30 secured to a linearly guided slide member 40. During the cutting process, a profile groove 4 is formed in the key blank, adjacent to its first or lower side surface 2. In this way, a pre-formed groove 4 of rectangular shape will be extended sideways or downwardly (to the right in FIG. 3B) into an undercut groove portion 4a (FIG. 8C). So, the preformed groove 4 is made by a conventional rotating cutting disc, whereas the undercut groove portion 4a is made by means of the linearly guided punching or broaching tool 30 according to the present invention. The rectangular profile groove 4 and its adjoining undercut portion 4a are clearly visible in the FIGS. 7A through 7E (the groove 4) and 8A through 8E (the undercut portion 4a which stands at right angle to the rectangular groove 4 in this case). See especially FIGS. 8C and 8E. The undercut portion 4a, which is also rectangular in shape, adjoins the groove 4 at some distance from the bottom of the relatively deep groove 4 and is relatively wide at its innermost part.

The undercut portion of the groove 4a extends only along the key blade up to the stopping step surface 5 near the gripping portion 6, along a length L1. Thus, in this embodiment, the undercut portion 4*a* will end with a distinct step surface inside the profile groove 4, whereas the remaining profile groove will end with a curved portion, corresponding to the shape of the cutting disc used when forming the rectangular initial groove 4. The innermost, undercut portion 4*a* of the profile groove may be used to achieve an axial stop, cooperating with a corresponding rib with a limited length in an associated key plug of a cylinder lock (not shown).

In this embodiment (FIGS. 1, 2, 3A, 3B, 4), the punching or broaching tool 30 is provided with one cutting tooth only, at the end of the tool 30 (to the left in FIGS. 1, 2 and 4).

The forces appearing when cutting the key blade by the punching or broaching tool 30 are very great, and it is imperative that the key blank is held firmly between the blocks 10, 20 and also that the linear guidance of the slide member 40 is very precise. The exact guidance of the slide member 40 is accomplished by way of machining or otherwise forming a longitudinal cavity 15 in the lower block 10 (FIG. 3A), the cavity extending in parallel to the upper seating surface 11 of the block 10 and to the longitudinal axis of the key blank upon placing the latter onto the seating surface 11 between the upstanding side portions 12, 13 of the lower block 10. Also, the cross-section of the slide member 40 corresponds exactly to the configuration of the cavity 15, with only a slight play enabling a linear but non-rotatable movement of the slide member 40 within the cavity 15. A non-shown drive mechanism will push the slide member longitudinally in the direction of the arrow B (FIGS. 1 and 2) with a great force, in order to carry out the cutting process of the punching or broaching tool 30. The drive mechanism may be constituted e.g. by a mechanical drive mechanism, an electro-mechanical drive mechanism, a pneumatic drive mechanism, or a hydraulic drive mechanism, as will be selected by those skilled in the art of general machinery.

The punching or broaching tool 30 must be thinly secured to the slide member 40, and this is achieved by a longitudinally extending neck portion 41 which is adapted to connect the slide member 40 with the punching or broaching tool 30 and which fits with a slight play in a longitudinal passageway 16 (FIGS. 1 and 2) formed in the lower block 10 adjacent to the cavity 15. The cavity 15 has a substantially rectangular cross-sectional configuration, with rounded edges, whereas the passageway 16 and the corresponding neck portion 41 have an upwardly tapering cross-section that will ensure a strong and durable connection to the punching or broaching tool 30.

Preferably, the slide member 40 and the cutting tool are made in one piece, but it is also possible to weld or screw them together.

In FIG. 3B it will be seen that the upper, cutting part of the punching or broaching tool 30 is formed with the same cross-sectional configuration as the desired cross-section of the undercut portion 4*a* of the profile groove.

In case the profile groove 4 is to be provided with a further undercut portion, it is feasible to use a modified punching or broaching tool having at least one further tooth having a configuration corresponding to the desired shape of the further undercut portion 4*aa*, as shown in FIGS. 8A', 8B', 8C', 8D' and 8E'. The further undercut portion 4*aa* adjoins an undercut portion 4*a* corresponding to the undercut portion 4*a* in the previous embodiment.

In this case, the profile groove 4 extends along the whole length of the key blade and along the major part of the gripping portion 6, along a total length L2 up to a hole in the gripping portion.

Another key blank is shown in FIGS. 8A", 8D" and 8E". In this case, the profile groove 4 with its undercut portion 4*a* extends along the full length L3 of the key blank 1, including the gripping portion 6 thereof. Here, the cross-section of the profile groove is the same all along the key blank, as will be seen in FIGS. 8A" and 8E".

In FIGS. 5 and 6, there is shown a modified embodiment of the groove forming apparatus including an upper, movable block 20' and a lower, stationary block 10' configured to receive a key blank 1 (oriented lying flat on a seating surface 11' as in FIGS. 1 and 2) between two rather shallow upstanding side portions 12', 13' and with a projecting portion 17 fitting into a hole 9 in the grip portion 6 of the key blank.

The height of the upstanding side portions 12', 13' is substantially the same as (or slightly less than) the thickness of the key blank 1, so that the key blade 1 will be firmly held in place by the upper block 20' when the latter is pressed down. Then, the planar lower surface (notvisible in FIGS. 5 and 6) clamps onto the key blank 1 and possibly also onto the lower block 10' (arrows A in FIG. 6).

The structure and function of the punching or broaching tool 30 and the slide member 40 are the same in this embodiment as in the previous one. The only difference is the configuration of the two blocks 10, 20 and 10', 20', respectively.

Of course, a key blank formed as described above is not a finished key. Rather, as is well-known in the art, it should be provided with some code pattern cooperating with tumblers in an associated cylinder lock (not shown). Such codes can be forming e.g. along the profile groove, so as to cooperate with side tumblers in the lock, and/or at a longitudinal edge 7, as shown in FIGS. 9A and 9B (where the edge cuts will cooperate with regular tumbler pins in a lock).

As indicated above, it is also possible to form an under-cut profile groove in one manufacturing step by using a broach having a number of cutting teeth. Various resulting key blanks are shown in FIGS. 11A through 11E, FIGS. 11A' through 11E' and FIGS. 11A", 11D" and 11E", the profile grooves being formed in one step in a key blank 1' as shown in FIGS. 10A through 10E and having no initial profile groove at all. Accordingly, the whole profile groove is formed in one step with a broach being forcedly guided along the key blade 1'.

Depending on the shape of the profile groove, the broach 30' is provided with a number of teeth 31', 32', 33', 34', etc. (see FIGS. 18A' and 18C'), where each successive tooth is displaced or extended somewhat in relation to the previous one. In this way, each tooth will cut away an additional amount of material in the key blank, and a rather complicated geometrical configuration can be obtained. Compare also the end view in FIG. 18B' showing the complete configuration or contour of the profile groove.

An advantage with the embodiment shown in FIGS. 17, 18A, etc. is that the profile groove can be manufactured in one step, which makes the production quicker and less costly.

Figure 13:
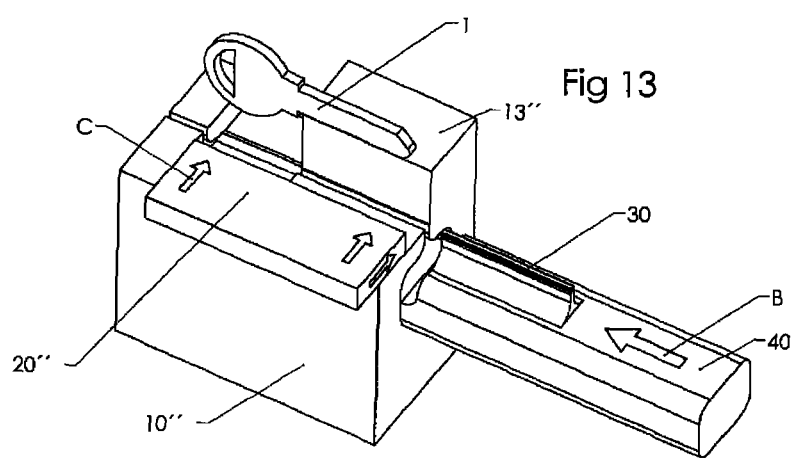

The invention may be implemented in various ways. An alternative groove making apparatus is shown in FIGS. 12 and 13. The main difference in relation to the embodiments shown in FIGS. 1, 2, 5 and 6 is that the movable block 20" is moved sideways (arrows C) against an upstanding portion 13" of the stationary, lower block 10" and that the key blank is oriented with its central plane standing vertically. Here, the profile groove is formed in the lower edge surface of the key blank 1. It is important that the opposite side surfaces of the key blank adjacent to its lower edge, are held firmly in place all along the edge surface in which the profile groove is being cut by means of the punching or broaching tool.

Otherwise, this apparatus, with the slide member 40 and the punching tool 30, operates basically in the same way as in the previous embodiments.

Although not shown in the drawings, the cavity 15 which guides the slide member 40 may be formed as an open recess in the lower block 10, preferably with undercut side portions serving to hold the edge portions of the slide member in place vertically, or it may be a circumferentially closed cavity. In the latter case, the key blank will have to be inserted into the cavity as well, possibly together with an insert member fitting precisely into the cavity together with the key blank. In such a case, there will be no movable block of the fixture, other than the insert member which is positioned axially into the cavity. It seems more practical, however, to have two blocks, one of which is movable vertically or transversely in relation to the other.

It may be possible to use a fixture with only one block having a recess at the top, with a seating surface for one (lower) side of the key blank, and longitudinal gripping teeth or ribs which engage with portions of the other (upper) side of the key blank. The risk of floating material on this upper side is lower, so such a fixture may also be useful, at least in case the profile groove in said one (lower) side of the key blank is rather shallow, e.g. less than half of the thickness of the key blade.

Figure 14A:
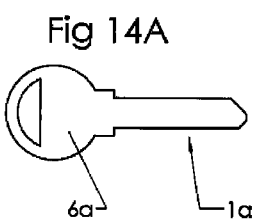
FIGS. 14A, 14B and 14C show side views of three different key blanks before forming any profile groove therein.
Figure 14B:
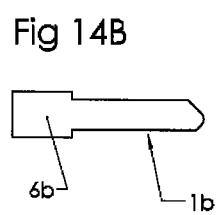
Figure 14C:
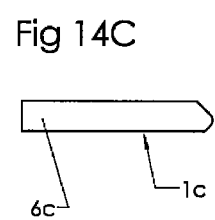
Figure 15A:
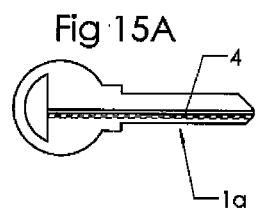
FIGS. 15A, 15B and 15C show corresponding side views of the key blanks shown in FIGS. 14A, 14B and 14C after forming an undercut profile groove in the side surface of each key blank.
Figure 15B:
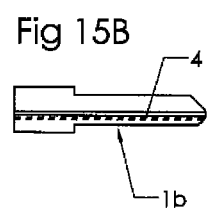
Figure 15C:
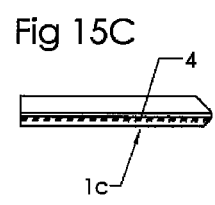
Figure 16A:
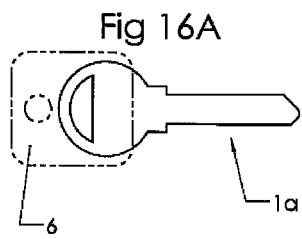
FIGS. 16A, 16B and 16C show the key blanks of FIGS. 14A, 14B and 14C provided with a separate gripping member attached to the respective key blade.
Figure 16B:
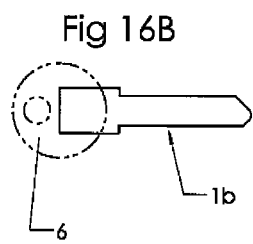
Figure 16C:
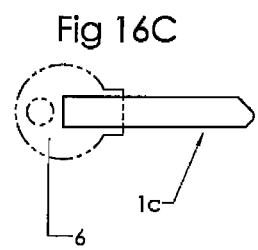

The key blank 1 may have a grip portion 6a, as shown in FIG. 14A (and in the other drawing figures of the embodiments described above), or it may have a base portion 6b or an extended portion 6c of the key blade which may be attached to a separate gripping member 6, as shown in FIGS. 16A, 16B and 16C. In either case, the key blank 1a, 1b, 1c may be provided with a profile groove 4 by means of an apparatus and a method as described above (before attaching the gripping separate member).

The exact shape of the profile groove may be selected as desired. There may be minor irregularities in the cross-sectional configuration, and it is also possible to leave rather thin walls between an undercut portion of the profiled groove, internally of a ridge portion, and the external side of such a ridge portion (which may form a part of side surface of the key blank).

In particular, it is possible to form profile grooves having any geometrical shape as disclosed in the international patent application published in WO2010/096009 (WINLOC AG).

Thus, the inventive method and apparatus will give a wide freedom in designing new keys for cylinder locks, with one or more profile grooves with or without an undercut groove portion.

Also, with a broach having a multitude of teeth, it is possible to cut a complicated shape of a profile groove in a single manufacturing step, which makes the production quick and not very expensive, at least when producing large number of key blanks.

The invention claimed is:

1. A method of forming a profile groove in an elongated key blank having a key blade with opposite side surfaces, said method comprising:
    forming said profile groove in a surface of said key blank by means of a broaching tool with at least one tooth which is forced and guided longitudinally in parallel to said elongated key blank so as to cut out material from said key blank into a desired profile shape, corresponding to a cross-sectional shape of said at least one tooth, said profile groove extending in a predetermined area from a distal end of the key blade towards a grip portion of the key blade, while
    at the same time holding said opposite side surfaces of the key blank between opposite holding surfaces of a fixture, causing a firm abutment and retaining action on the longitudinal side surface portions of the key blade located adjacent to and all along said profile groove being formed, whereby the key blank material adjacent to said profile groove is retained in a fixed state without being deformed during the broaching operation.

2. The method defined in claim 1, wherein said broaching tool is secured to a slide member which is forced and guided rectilinearly in relation to said fixture.

3. The method defined in claim 2, wherein said slide member is guided in a longitudinal recess in said fixture.

4. The method defined in claim 1, wherein said fixture comprises a stationary first holding member provided with a first holding surface, and a movable second holding member provided with a second holding surface, said second holding member being pressed against said first holding member during said broaching operation.

5. The method defined in claim 1, wherein said profile groove has at least one undercut portion defined by an inner bottom wall and an opposite wall on an inside of a ridge portion, an outside of which forms at least a part of said longitudinal side surface portions being held by said fixture during said broaching operation.

6. A broaching apparatus for forming a profile groove in an elongated key blank, comprising:
    a longitudinally guided broaching tool with at least one tooth for forced movement longitudinally along the key blank and cutting out said profile groove in said key blank during a broaching operation, said profile groove extending in a predetermined area from a distal end of the key blade towards a grip portion or the key blade,
    a fixture provided with a guiding device for longitudinally guiding said broaching tool during said broaching operation, and
    a holding device in said fixture, said holding device having two opposite holding surfaces adapted to abut against two opposite, longitudinal side surface portions of said key blank during said broaching operation, causing an abutment and retaining action on the longitudinal side surface portions located adjacent to and all along said profile groove being formed, whereby the key blank material adjacent to said profile groove is retained in a fixed state without being deformed during the broaching operation.

7. The broaching apparatus defined in claim 6, wherein said guiding device comprises a slide member being longitudinally guided in said fixture, said broaching tool being secured to said slide member.

8. The broaching apparatus defined in claim 7, wherein said broaching tool is integrated in one piece with said slide member.

9. The broaching apparatus defined in claim 7, wherein said slide member is connected to said broaching tool via a neck portion which is movable in a passageway between said holding device and a guiding recess in said fixture.

10. The broaching apparatus defined in claim 9, wherein said guiding recess is a longitudinal guiding cavity in said fixture, said cavity being dimensioned to accommodate said slide member with a slight play enabling a linear but non-rotatable movement in parallel to said key blank when being held in said holding device of said fixture.

11. The broaching apparatus defined in claim 6, wherein said broaching tool is forcedly movable along one of the following:
- at least a part of a length of said key blank,
- at least a full length of said key blank up to a gripping portion, and
- the full length of said key blank, including said gripping portion.

12. The broaching apparatus defined in claim 6, wherein said holding device comprises two opposite holding members, a first one being stationary and provided with a first holding surface, and a second one being movable and provided with said second holding surface, so as to clamp and hold said key blank during said broaching operation.

13. The broaching apparatus defined in claim 12, wherein said movable second holding member is pressed against said stationary first holding member by one of the following drive mechanisms: a mechanical drive mechanism, an electro-mechanical drive mechanism, a pneumatic drive mechanism and a hydraulic drive mechanism.

14. The broaching apparatus defined in claim 6, wherein said broaching tool has only one tooth.

15. The broaching apparatus defined in claim 6, wherein said punching tool is a broach having two or more teeth.

* * * * *